United States Patent Office 2,961,674
Patented Nov. 29, 1960

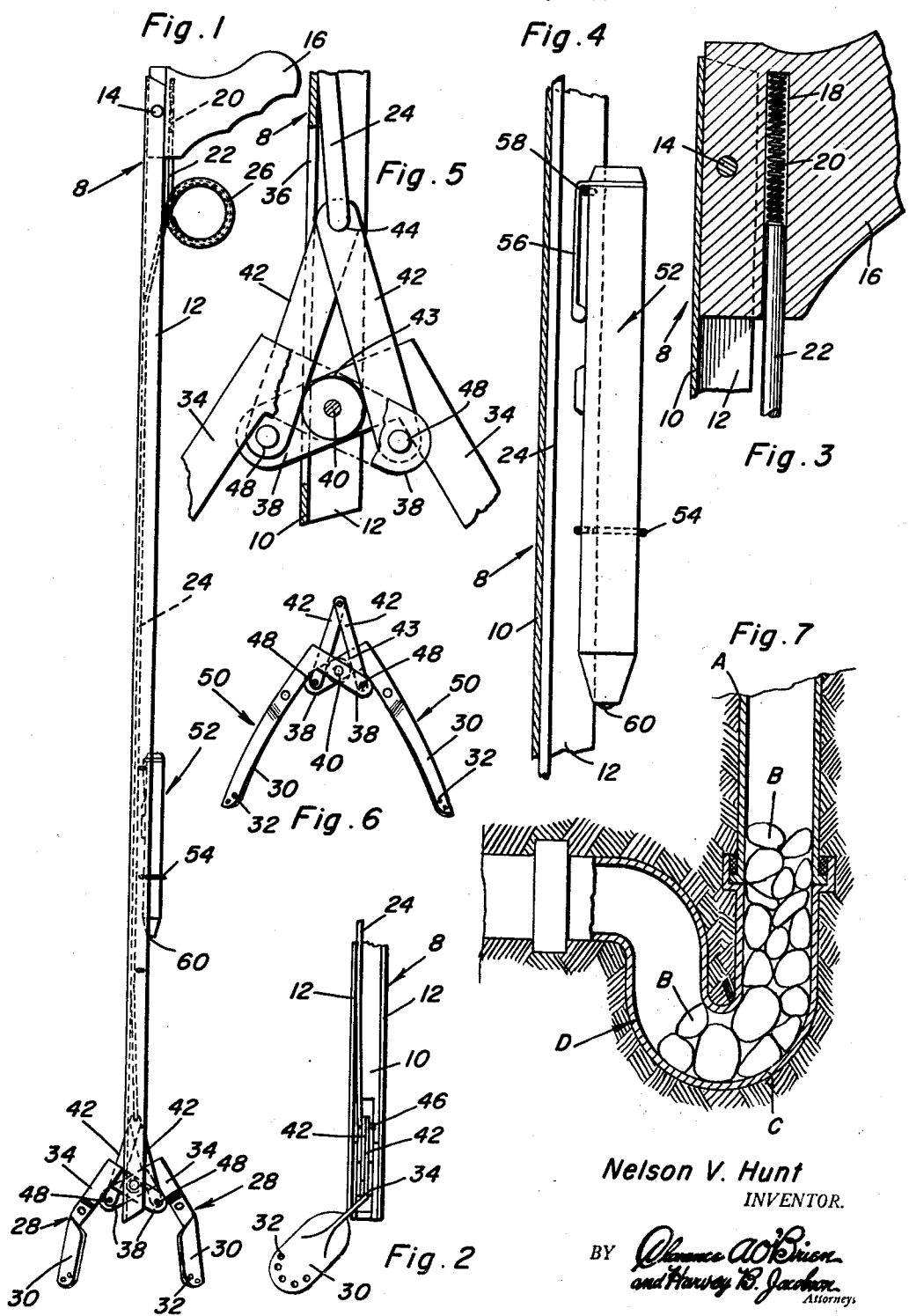

2,961,674

SEWER TRAP CLEAN-OUT IMPLEMENT

Nelson V. Hunt, 1107 Wood Ave.,
Colorado Springs, Colo.

Filed Feb. 14, 1957, Ser. No. 640,184

2 Claims. (Cl. 15—104.3)

The present invention relates to a novel tongs-type implement which is expressly constructed and designed to enable a user thereof to catch hold of and remove rocks, debris and obstructions from a sewer trap by way of an elongated standpipe reaching from the ground level or surface to and connected with said trap.

The implement is especially, although not necessarily, adapted to be used at a trailer court or the like. Under ordinary circumstances it would, more likely than not, be brought into use at a vacant trailer space. In this connection it is to be explained that children, while at play, are often given to removing the standpipe cover at unoccupied trailer spaces. They proceed to drop stones, rocks, sticks and even sand into the standpipe and much of this trash lodges itself in the gooseneck trap, resulting in blockage.

Under present prevailing practice the prospective occupant of the trailer space finds it expedient to check the trap before attaching the soil pipe of his trailer and bringing the same into use. When it is found to be stopped up the services of a plumber would be required. The plumber usually digs up the pipe and trap to heat the lead connections and to dismantle the parts and remove the obstruction. This means, too, that he has to replace the lead connections and trap and pipe and then refill the excavation. Manifestly, this is expensive.

The obvious purpose of the instant invention is to dispense with the time consuming services and expense above mentioned and to make it possible for the trailer owner himself to fish down into the trap by way of the standpipe and dislodge and remove rocks and other obstructions and ready the trap for unobstructed functioning. To this end a simple, practical and economical hand implement is provided.

Briefly, the implement is characterized by an elongated reach member which functions as a handle and which is sufficiently long to allow it to descend into the standpipe. It has a handgrip at its upper proximal end and a pair of grappling jaws at the lower end. The jaws have shank portions which are pivotally mounted in cooperating relationship on the distal or leading end of the handle. A spring biased push-pull rod is mounted for reciprocation and is in approximate parallel relationship to the handle. An operating connection between the lower end of the rod and shank portion of the jaws makes it an easy matter to open and close the jaws. To facilitate the operation the push-pull rod is provided adjacent the hand-grip with a finger ring or grip which functions like a trigger.

Other objects, features and advantages will become more readily apparent from the following description and the accompanying drawings.

In the drawing, wherein like numerals are employed to designate like parts throughout the views:

Fig. 1 is an elevational view of the sewer trap clean-out implement;

Fig. 2 is a fragmentary elevational view showing the jaws offset to facilitate reaching into the crook of the trap;

Fig. 3 is an enlarged view in section and elevation detailing the spring biased end of the push-pull rod;

Fig. 4 is a fragmentary view in section and elevation emphasizing the optionally usable flashlight;

Fig. 5 is a fragmentary view in section and elevation detailing the shank portions of the jaws and toggle links;

Fig. 6 is an elevational view on a smaller scale of the same basic construction but with the scoop-like jaws straight instead of at oblique angles as seen in Fig. 2; and Fig. 7 is a view in section of the trap.

The reach member or handle is denoted by the numeral 8 and is of suitable length for the purposes intended. It is preferably a rigid elongated channel iron embodying a bight portion 10 and side flanges 12. Fixed by a pin or the like 14 between the upper ends of the side flanges is a wooden or equivalent hand-grip 16 which may be said to be a pistol-grip type. This has a socket 18 therein (Fig. 3) housing a coil spring 20 which bears against the upper end portion 22 of a push-pull rod 24 which is seated in the channel for reciprocation. The upper end portion of the rod is formed into a finger ring 26 which is adjacent to the hand-grip and serves in a trigger-like manner.

The pair of jaws at the lower or distal end are denoted by the numeral 28. The jaws proper are dished and scoop-like in form as is denoted at 30. The free end portion is provided with indentations or the like 32 providing anti-slipping teeth. The shank portion of each jaw is generally L-shaped with the substantially straight portion 34 disposed outwardly of the channel for cooperation with the slotted portion 36 of the handle best shown in Fig. 5. As seen here the laterally directed portions 38 cross each other and extending in opposite directions through the slot 36 cooperate with each other and are hingedly mounted on a pin 40 carried by the handle. There is a spacing washer 43 interposed between the portions 38. The toggle links 42 have their upper end portions hingedly connected as at 44 through a laterally directed terminal bend or hook 46 (Fig. 2) at the lower end of the push-pull rod. The lower ends of the links are pivotally connected at 48 to the outer free end portions of the respective shank portions 38, all as clearly seen in Fig. 5. The spring 20 exerts a downward thrust on the thrust rod 22 and consequently by way of the linkage and shank portions the jaws are spread apart normally. When one desires to use the device it is positioned in a seemingly obvious manner. That is to say, the elongated reach handle is forced down through the bore of the standpipe A (Fig. 7) in a manner that the jaws 28 may be brought into grappling association with the stones or other obstructions B in the standpipe and the crooked portion C of the sewer trap D. The jaws are normally open and a stone is grasped therebetween in an obvious manner and then the trigger is pulled in relation to the hand-grip and the jaws are closed and the stone is lifted and disposed of. The only difference between the jaws as seen in Fig. 6 and the other figures is that the jaws 50 in Fig. 6 are "straight" while the jaws in Figs. 1 and 2 are offset. That is to say, that the jaws are oblique angled and are out of line with the axis of the handle and push rod to facilitate projecting and using the same in the trap in a seemingly obvious manner.

If desired, a suitable pocket-type flashlight 52 (Fig. 4) may be used. This is held partly in place by a suitable holding ring 54 with the pocket clip 56 fitting over a cross pin 58. The bulb 60 of the flashlight is pointed in the direction of the jaws.

It is to be noted that the socket 18 which houses the coil spring opens through the lower edge of the hand-grip 16 in a position which as seen in Fig. 3 is in a plane outwardly of the lengthwise edges of the flanges 12. This construction allows the end portion 22 to telescope into the socket thus concealing and protecting the coil spring 20.

The fact that the channel in the handle is open along one side, the entire rod 24 as an entity can be readily inserted into the channel. It can be also removed and replaced if necessary or desired. It is further noted that the bend or laterally bent end portion 46 at the lower end (lower in the drawing) is of a length that it fits with requisite nicety into the space provided therefor in the channel, that is, crosswise of the channel as seen in Fig. 2 for example. This bent portion 46 makes it possible to "hook" the aligned holes 44 over the bend or hook 46.

It is to be also stressed that the L-shaped shank portions or shanks constitute cooperable bell cranks. These bell cranks have their laterally bent end portions 38 not only disposed together in crossed relation within the confines of the channel and pivoted in the channel as shown at 40 in Fig. 5, one end or terminal at the left in Fig. 5 projects through and beyond the slot 36 and the other end to the right projects through and beyond the open side of the channel. By reason of this construction and the attaching of the lower ends of the links 42 to the terminals of the end portions 38, the transmission of forces from the links 42 to the pivot points 48 is of a distinct advantage. In fact this consolidation of force is increased by the bell-crank action since the portions 38 of the bell cranks are actually hinged or pivoted in the V-shaped crotch or space existing between the links 42.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in catching hold of and removing stones, dirt and debris and similar obstructions from a standpipe or an elbow-like trap at the lower end of said standpipe, a manually usable implement comprising a rigid elongated handle channel-shaped in cross-section and embodying a bight portion and side flanges, said bight portion being provided inwardly of one end of the channel with a slot, a laterally directed pistol-type hand-grip having an end portion seated in the channel adjacent the other end of said channel and secured between said side flanges, said hand-grip having a socket therein adjacent and parallel to but situated in a plane outwardly of the plane of the adjacent lengthwise edge portions of said flanges, a push-pull rod substantially commensurate in length with and seated for reciprocation in said channel, a coil spring located in said socket, one end of said rod fitting telescopically into said socket and bearing against said coil spring, that portion of the rod adjacent to a cooperating edge of said hand-grip having a finger ring whereby the user may catch hold of the hand-grip with one hand and use a finger of the same hand to trigger said finger ring and push-pull rod, the other end portion of said push-pull rod extending to a position in the channel within the vicinity of said slot and having a lateral bend, a pair of grappling jaws opposed to each other in cooperating relationship, said jaws having L-shaped shank portions operating through and in said slot and pivotally connected to adjacent portions of the flanges close to said slot, and a pair of toggle links having corresponding ends hingedly connected to said lateral bend and pivotally connected at opposite ends to adjacent ends of said shank portions, said jaws being scoop-like in form and disposed at oblique angles to the axis of the handle and rod, respectively, and being offset sufficiently to reach into a crook portion of the aforementioned elbow-like trap.

2. A grapple for catching hold of and removing stones, debris, and similar obstructions from a standpipe, a manually usable implement comprising a rigid elongated reach member channel-shaped in cross-section and embodying a bight portion and side flanges, said bight portion being provided inwardly of one end of the channel with a slot, a pistol-type hand-grip having an end portion seated in the channel adjacent the other end of said channel and secured between said side flanges, said hand-grip being disposed at right angles to the axis of said reach member and having a socket therein adjacent and parallel to but situated in a plane outwardly of the plane of the adjacent lengthwise edge portions of said flanges, said socket opening through marginal edge of said hand-grip in alignment with the open side of the channel, a push-pull rod substantially commensurate in length with and seated for reciprocation in said channel, a coil spring fitting in the closed end portion of said socket, one end of said rod fitting telescopically into said socket and bearing against said coil spring, that portion of the rod adjacent to the aforementioned marginal edge of said hand-grip having a finger-ring whereby the user may catch hold of the same with one hand and use a finger of the same hand to trigger said finger ring and push-pull rod, the other end portion of said push-pull rod extending to a position in the channel within the vicinity of said slot and terminating in a lateral bend, a pair of flat toggle links having converging overlapping ends provided with aligned holes, said lateral bend extending through said holes and serving to hingedly connect said links with each other, said hinged connection being normally located adjacent one end portion of said slot, a pair of grappling jaws situated in operating position beyond but adjacent the slotted end portion of said handle, said jaws having L-shaped shanks and said shanks constituting cooperable bell-cranks, the latter having angular end portions crossing each other within the confines of the channel and free terminal portions projecting through the slot in diametrically opposite directions, said crossed portions being pivotally joined with each other and also with said side flanges, and the locale of said pivot being opposite the other end of said slot but confined to a position in the normally existing space between the aforementioned toggle links, the free end portions of the toggle links being pivotally connected to the respective terminal portions of said angular end portions.

References Cited in the file of this patent

UNITED STATES PATENTS

| 102,049 | Scanlan | Apr. 19, 1870 |
| 902,661 | Johnson | Nov. 3, 1908 |
| 1,053,770 | Barager | Feb. 18, 1913 |
| 1,180,764 | Derdits | Apr. 25, 1916 |
| 1,205,414 | Titus | Nov. 21, 1916 |
| 2,420,980 | Reise | May 20, 1947 |
| 2,634,158 | Tibbs | Apr. 7, 1953 |

FOREIGN PATENTS

| 11,834 | Great Britain | June 29, 1900 |